United States Patent
Reisch et al.

(10) Patent No.: US 10,989,104 B2
(45) Date of Patent: Apr. 27, 2021

(54) JET PATTERN OF A MULTI-HOLE INJECTION VALVE FOR INJECTION PRESSURES OF OVER 300 BAR IN SPARK-IGNITION ENGINES HAVING A CENTRAL INJECTOR POSITION

(71) Applicant: VOLKSWAGEN AKTIENGESELLSCHAFT, Wolfsburg (DE)

(72) Inventors: Uwe Reisch, Wolfsburg (DE); Mario Campe, Calberlah (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/603,665

(22) PCT Filed: Mar. 28, 2018

(86) PCT No.: PCT/EP2018/057913
§ 371 (c)(1),
(2) Date: Oct. 8, 2019

(87) PCT Pub. No.: WO2018/188954
PCT Pub. Date: Oct. 18, 2018

(65) Prior Publication Data
US 2020/0116073 A1 Apr. 16, 2020

(30) Foreign Application Priority Data
Apr. 12, 2017 (DE) .................... 10 2017 107 947.5

(51) Int. Cl.
*F02B 17/00* (2006.01)
*F02B 23/10* (2006.01)
(Continued)

(52) U.S. Cl.
CPC .......... *F02B 17/005* (2013.01); *F02B 23/104* (2013.01); *F02B 2023/103* (2013.01);
(Continued)

(58) Field of Classification Search
CPC ........ F02B 17/00; F02B 17/005; F02B 23/06; F02B 23/0621; F02B 23/0651;
(Continued)

(56) References Cited

U.S. PATENT DOCUMENTS 7,418,940 B1  9/2008 Yi et al.
9,695,723 B2 * 7/2017 Record ............. F02M 61/1846
(Continued)

FOREIGN PATENT DOCUMENTS

DE        100 32 330 A1   1/2002
DE   10 2008 000 004 A1   7/2008
(Continued)

OTHER PUBLICATIONS

International Search Report of PCT Application No. PCT/EP2018/057913, dated Jun. 6, 2018.

*Primary Examiner* — John Kwon
*Assistant Examiner* — Johnny H Hoang
(74) *Attorney, Agent, or Firm* — Pearl Cohen Zedek Latzer Baratz LLP (57) ABSTRACT

The invention relates to an internal combustion engine and to a method for operating the internal combustion engine, which has at least one cylinder having a combustion chamber, the combustion chamber being bounded by a cylinder roof, a cylinder wall and a movable cylinder piston, a multi-hole injection nozzle and a spark plug being arranged in a central position in the cylinder roof, the multi-hole injection nozzle injecting fuel into the combustion chamber at injection pressures of >/=300 bar by means of a plurality of injection jets. It is provided that at least one injection jet
(Continued)

(i>/=1) injects fuel into a three-dimensional space within the combustion chamber on the intake side, which space lies below an opening of at least one intake valve (104A, 104B) with respect to the direction of the longitudinal central axis (Z) of the cylinder, and at least four injections jets (i>/=4) inject fuel into a three-dimensional space of the combustion chamber on the exhaust side, which space lies below an opening of at least one exhaust valve (105A, 105B).

7 Claims, 4 Drawing Sheets

(51) Int. Cl.
*F02B 75/12* (2006.01)
*F02D 41/38* (2006.01)
*F02F 3/26* (2006.01)
*F02F 1/24* (2006.01)

(52) U.S. Cl.
CPC ... *F02B 2023/106* (2013.01); *F02B 2075/125* (2013.01); *F02D 2041/389* (2013.01); *F02F 3/26* (2013.01); *F02F 2001/245* (2013.01)

(58) Field of Classification Search
CPC .. F02B 23/0672; F02B 23/0693; F02B 23/10; F02B 23/101; F02B 23/104; F02B 2023/102; F02B 2023/103; F02D 41/024; F02D 41/0255; F02D 41/04; F02D 41/064; F02D 41/3023; F02D 41/38; F02D 41/3813; F02D 41/3818; F02D 2041/389; F02M 61/18; F02M 61/1806; F02M 69/04; Y02T 10/125; Y02T 10/26
USPC .............. 123/295–305, 445, 490, 498, 499
See application file for complete search history.

(56) References Cited

U.S. PATENT DOCUMENTS

| | | | |
|---|---|---|---|
| 2004/0011324 | A1 | 1/2004 | Arndt et al. |
| 2004/0211388 | A1* | 10/2004 | Hiraya ................ F02D 37/02 123/276 |
| 2008/0169367 | A1 | 7/2008 | Oomura et al. |
| 2009/0025681 | A1* | 1/2009 | Takahashi ......... F02M 61/1826 123/305 |
| 2010/0258076 | A1* | 10/2010 | Eismark ............. F02B 23/0651 123/279 |
| 2012/0060792 | A1* | 3/2012 | Solferino ............... F02M 61/14 123/298 |
| 2014/0251274 | A1 | 9/2014 | Schintzel et al. |
| 2016/0265418 | A1* | 9/2016 | Martinez Alvarado ................ F02M 61/1813 |
| 2018/0017013 | A1* | 1/2018 | Khosravi ........... F02D 41/3836 |
| 2019/0040814 | A1* | 2/2019 | Hosaka .................. F02P 5/15 |

FOREIGN PATENT DOCUMENTS

| | | |
|---|---|---|
| DE | 10 2009 002 323 A1 | 12/2009 |
| DE | 10 2015 205 837 A | 11/2015 |
| WO | WO 2002/002928 A1 | 7/2001 |
| WO | WO 2012/045850 A2 | 4/2012 |
| WO | WO 2012/146378 A2 | 11/2012 |

* cited by examiner

| $\delta_1$ | 0° |
|---|---|
| $\gamma_1$ | 15° |
| $\delta_2; \delta_5$ | +/- 120° |
| $\gamma_2; \gamma_5$ | 57° |
| $\delta_3; \delta_4$ | +/- (150°-155°) |
| $\gamma_3; \gamma_4$ | 30°(30°-39°) |
| $\gamma'_3; \gamma'_4$ | 39°(30°-39°) |

| $\delta_1$ | 0° |
| $\gamma_1$ | 15° |
| $\delta_2;\delta_5$ | +/- 120° |
| $\gamma_2;\gamma_5$ | 57° |
| $\delta_3;\delta_4$ | +/- (150°-155°) |
| $\gamma_3;\gamma_4$ | 30°(30°-39°) |
| $\gamma'_3;\gamma'_4$ | 39°(30°-39°) |

| $\delta_1$ | 0° |
| $\gamma_1$ | 15° |
| $\delta_2;\delta_5$ | +/- 120° |
| $\gamma_2;\gamma_5$ | 57° |
| $\delta_3;\delta_4$ | +/- (150°-155°) |
| $\gamma_3;\gamma_4$ | 30°(30°-39°) |
| $\gamma'_3;\gamma'_4$ | 39°(30°-39°) |

FIG. 4C

JET PATTERN OF A MULTI-HOLE INJECTION VALVE FOR INJECTION PRESSURES OF OVER 300 BAR IN SPARK-IGNITION ENGINES HAVING A CENTRAL INJECTOR POSITION

CROSS-REFERENCE TO RELATED APPLICATIONS

This application is a National Phase Application of PCT International Application No. PCT/EP2018/057913, International Filing Date Mar. 28, 2018, claiming priority of German Patent Application No. 10 2017 107 947.5, filed Apr. 12, 2017, which is hereby incorporated by reference.

FIELD OF THE INVENTION

The invention relates to an internal combustion engine and to a method for operating the internal combustion engine, which has at least one cylinder having a combustion chamber, the combustion chamber being bounded by a cylinder roof, a cylinder wall, and a movable cylinder piston, a multi-hole injection nozzle and a spark plug being arranged in a central position in the cylinder roof, and the multi-hole injection nozzle injecting fuel into the combustion chamber at injection pressures of 300 bar via a plurality of injection jets.

BACKGROUND OF THE INVENTION

In the Miller process, the valve closing times are modified compared to a conventional internal combustion engine. During the Miller cycle, the intake valve closes earlier (well before the piston reaches UT) than with conventional gasoline engines. This is accompanied by two effects. First, the temperature of the air flowing into the combustion chamber is lower in turbofan engines. Second, the amount of air charge flowing into the combustion chamber and the final discharge pressure are smaller with the same compression and expansion ratio. In other words, due to the fact that the is valve is already closing during the intake stroke, the amount of air in the combustion chamber is not only cooler, but there is also less air in it than would be otherwise possible. Ultimately, the goal is to release more expansion energy through better combustion and thus make more efficient use of fuel. The resulting higher efficiency is also reflected in lower exhaust gas temperatures. The disadvantage of a lower cylinder charge due to the earlier closure of the intake valve is overcome through provision of a turbocharger or of more displacement. Since more displacement is not the goal in modern engines, and downsizing is the general aim, the Miller process is currently used in engines with turbocharger and variable valve timing. It is known that, in the future, the Miller combustion process will be used for gasoline engines with an unusually high compression ratio of 12.5:1, for example, and charging by means of an exhaust gas turbocharger with variable turbine geometry. What is more, common-rail injection systems with increased injection pressure compared to conventional gasoline engines of 300 bar or more will be used in gasoline engines in the future. This development necessitates a review of the jet patterns of conventional multi-hole injection valves for gasoline engines for injection pressures of greater than or equal to 300 bar.

Printed publication WO 2012/045850 A2 discloses a method for operating a four-stroke internal combustion engine with spark ignition and direct fuel injection into a combustion chamber in which at least two injections are carried out at least in the warm-up range and/or in the warm operating state of the internal combustion engine. A provision is made that, in a higher partial load or full load range, a first injection or start of injection is carried out in the intake stroke in a first or second time window and a second injection or start of injection is carried out in the intake stroke in the second or third time window, it being preferred that only one injection or start of injection occur per time window. In the conventional method, it has been found that the best results can be achieved if six or seven injection openings are used per injector for the jet pattern of the injector. In the case of a lateral injector position, two injection openings are used at the top, two injection openings at the bottom, and two injection openings at the side, for example. To improve the layerability, a central injection opening can also be used. Therefore, six-hole injectors are generally used when the injector is in a centered position. In that case, two injection jets are advantageously aimed in the direction of the spark plug. The overall jet preferably has an oval shape, since the charge motion influences the injection jets. The oval shape reduces wall wetting. However, as the publication indicates, this approach and the orientation of the injection jets are verified and advantageous only for injection pressures of no more than 300 bar in the high load range of the internal combustion engine.

SUMMARY OF THE INVENTION

It is the object of the invention to provide a jet pattern (spray) of a multi-hole injection nozzle for a spark-ignition internal combustion engine that ensures an optimum mixture formation of the fuel/air mixture and optimum mixture ignition at injection pressures of greater than or equal to 300 bar.

The starting point of the invention is a combustion engine comprising at least one cylinder with a combustion chamber, the combustion chamber being bounded by a cylinder roof, a cylinder wall, and a movable cylinder piston, a multi-hole injection nozzle and a spark plug being arranged in a central position in the cylinder roof, and the multi-hole injection nozzle injecting fuel into the combustion chamber at injection pressures of ≥300 bar via a plurality of injection jets.

A provision is made according to the invention that at least one injection jet injects fuel into a three-dimensional space within the intake-side combustion chamber, which, viewed in the direction of the longitudinal central axis of the cylinder, lies below an opening of at least one intake valve, and inject at least four injection jets of fuel into a three-dimensional space of the exhaust-side combustion chamber located in the direction of the longitudinal central axis of the cylinder below an opening of at least one exhaust valve.

The three-dimensional space is defined by a δ-angle adjustment range and a γ-angle adjustment range of the injection angles of the at least five injection jets.

In order to determine the three-dimensional position of the injection jets in three-dimensional space, each of the injection jets is assigned an δ-injection angle, which is defined as an angle relative to an injector axis, the injector axis associated with the δ-injection angle forming a spanned normal plane with a further orthogonal injector axis, each injection jet being further associated with a δ-injection angle, which is defined as an angle relative to an injector longitudinal axis that is orthogonal to the normal plane.

According to the invention, a provision is made that the δ-injection angles of the at least four exhaust-side injection jets are oriented relative to the defined injector axis of the normal plane in a δ-angle adjustment range between +/−100° and +/−170° to the injector axis and relative to the defined injector longitudinal axis in a γ-angle adjustment range between 25° and 75°.

Preferably, two of the four injection jets are arranged symmetrically relative to the defined injector axis of the normal plane.

In the case of a five-hole injection nozzle, a provision is preferably made that a second injection jet is arranged relative to the normal plane between the first injection jet and the third injection jet, and that a fifth injection jet is arranged relative to the normal plane between the first injection jet and the fourth injection jet, with only the first injection jet on the intake side injecting into the combustion chamber.

In a preferred embodiment, a provision is made that the injection angle of the first injection jet relative to the normal plane equals 0°, and that the injection angle of the first injection jet relative to the injector longitudinal axis equals 15°, whereby the injection jet injects in the direction of the cylinder piston into the intake-side region of the combustion chamber of the cylinder.

In the case of a five-hole injection nozzle, it is additionally preferred that the injection angles of the second and fifth injection jets within the δ-angle adjustment range relative to the normal plane be equal to +/−120°, and that the injection angles of the second and fifth injection jets within the δ-angle adjustment range relative to the injector longitudinal axis be equal to 57°, whereby the injection jets inject substantially in the direction of the cylinder wall into the exhaust-side region of the combustion chamber of the cylinder.

In one embodiment, it is also preferred that the injection angles of the third and fourth injection jets within the δ-angle adjustment range relative to the normal plane be equal to +/−150°, and that the injection angles of the third and fourth injection jets within the γ-angle adjustment range relative to the injector longitudinal axis be equal to 30°, whereby the injection jets inject into the region between the cylinder piston and the cylinder wall into the exhaust-side region of the combustion chamber of the cylinder.

In another embodiment, it is preferred that the injection angles of the third and fourth injection jets within the δ-angle adjustment range relative to the normal plane be equal to +/−155°, and that the injection angles of the third and fourth injection jets within the γ-angle adjustment range relative to the injector longitudinal axis be equal to 39°, whereby the injection jets inject substantially in the direction of the cylinder wall into the exhaust-side region of the combustion chamber of the cylinder.

In a preferred embodiment, a provision is made that, when the injector is installed in the center position, the injector longitudinal axis of the injector is inclined relative to a vertical axis z by an angle of inclination of between 0° and 15° in the direction of the exhaust valves, particularly by an angle of inclination equal to 5°.

A method for operating an internal combustion engine comprising at least one cylinder with a combustion chamber, the combustion chamber being bounded by a cylinder roof, a cylinder wall, and a movable cylinder piston, a multi-hole injection nozzle, particularly a five-hole injection nozzle, and a spark plug being arranged in a central position in the cylinder roof, and the multi-hole injection nozzle injecting fuel into the combustion chamber at injection pressures of ≥300 bar via a plurality of injection jets, is characterized in that, as a result of an orientation of the injection jets of the multi-hole injection nozzle and the high injection pressure of ≥300 bar of the injection jets of the multi-hole injection nozzle, a charge motion within the combustion chamber is intensified by the kinetic energy of the injection jets and the deflection of the intake flow due to the injection jets.

The method is further characterized in that, as a result of an orientation of the injection jets of the multi-hole injection nozzle, particularly of the five-hole injection nozzle, and due to the high injection pressure of ≥300 bar of the injection jets of the multi-hole injection nozzle within the combustion chamber, the turbulent flow (tumble) of the fuel/air mixture caused by the intake flow and the deflection of the intake flow are intensified by the kinetic energy of the injection jets, with the exhaust-side injection jets penetrating with low penetration depth into the tumble flow, the fuel being finely atomized by the high injection pressure of ≥300 bar, and the tumble flow being deflected via the cylinder piston into the intake-side region and finally acting upon and encompassing the at least one intake-side injection jet.

Furthermore, as a result of an orientation of the injection jets of the multi-hole injection nozzle, particularly of the five-hole injection nozzle, and due to the high injection pressure of ≥300 bar of the injection jets of the multi-hole injection nozzle within the combustion chamber, ignition of the fuel by means of the spark plug is improved, since at least two of the exhaust-side injection jets are preferably arranged so as to be oriented toward the spark plug.

The aforementioned method sequences occur as a function of the configuration of the internal combustion engine alone or in combination.

It is preferably proposed that the method be integrated into a combustion process in which at least one intake valve is already closed before the cylinder piston reaches bottom dead center, since the effects described are of particular advantage in such processes, as will be explained in more detail in the description.

In particular, the solution according to the invention is proposed for use in the Miller combustion process for an Otto internal combustion engine, as will be explained. Use is not limited to this combustion process, however. Conventional engines can also be configured accordingly and operated according to the described method.

BRIEF DESCRIPTION OF THE DRAWINGS

The invention will be explained in the following with reference to the accompanying drawing. In the drawing.

DETAILED DESCRIPTION OF THE INVENTION

The following description with reference to the figures explains and shows a preferred embodiment in the form of a multi-hole injection nozzle with five nozzle holes and thus with five injection jets 1, 2, 3, 4, 5. The best results were obtained with the multi-hole injection nozzle with five nozzle holes, it being indicated in the description within which limits the invention is practicable beyond the preferred embodiment.

The angular position of the injection jets 1, 2, 3, 4, 5 according to the invention into a combustion chamber of a cylinder of an internal combustion engine 100 will be explained with reference to a Cartesian injector coordinate system, which is defined with respect to the injector position of an injector INJ (injection nozzle) relative to a cylindrical combustion chamber of the cylinder.

Figure 1:
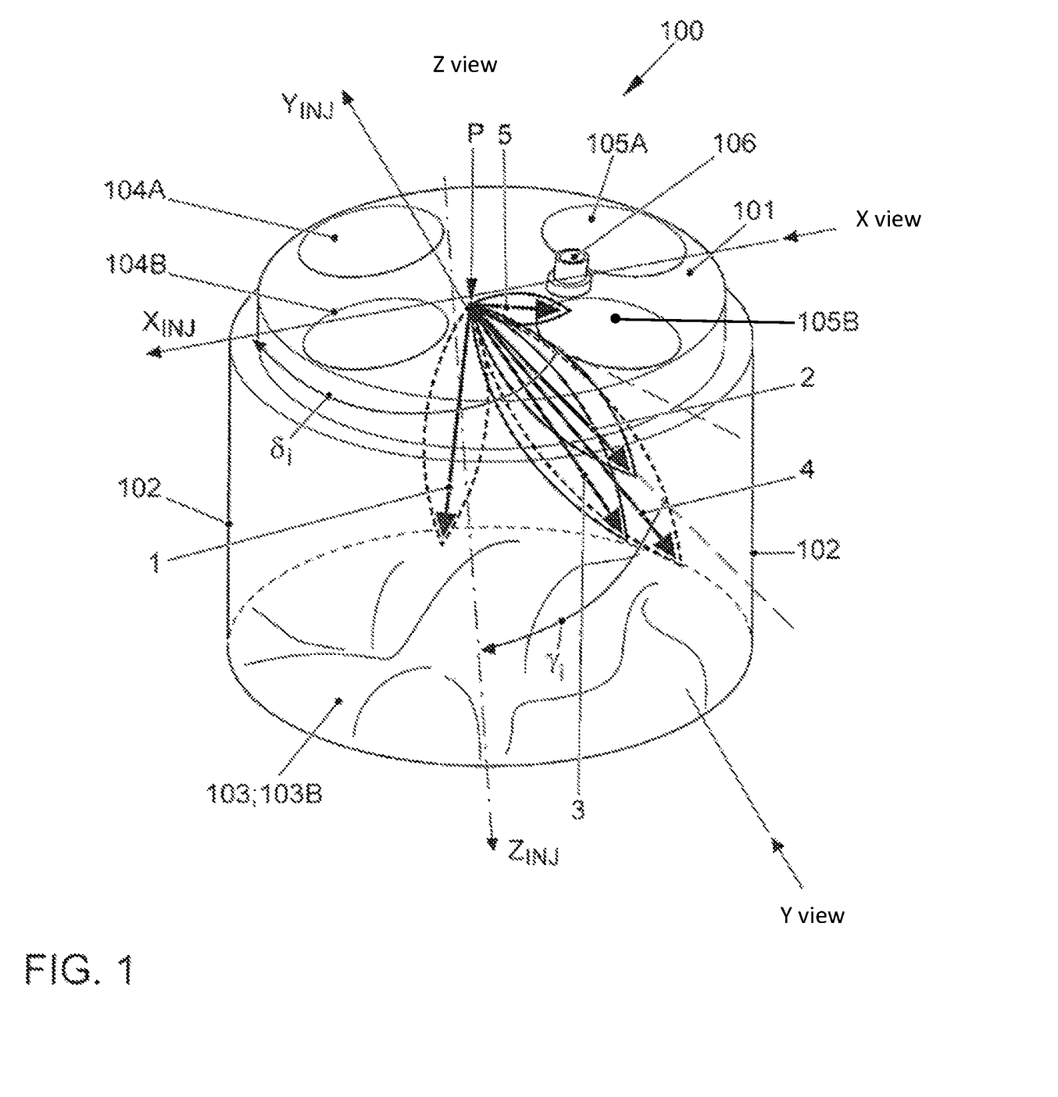
FIG. 1 is a perspective view of a three-dimensionally illustrated cylinder of an internal combustion engine.

FIG. 1 shows a perspective view of the combustion chamber of the cylinder of the internal combustion engine 100, which combustion chamber is bounded by a cylinder roof 101, the cylindrical cylinder wall 102, and a cylinder piston 103 with valve pockets.

Also shown are two openings for a respective intake valve 104A, 104B, and two openings for a respective exhaust valve 105A, 105B.

The spark plug 106 and the injector INJ are arranged in the so-called center position. In other words, the invention relates to a cylinder of a gasoline engine 100 with gasoline direct injection and central injector position.

When employed for a multi-hole injection nozzle with the inventive spray formation of the injection jets of the multi-hole injection nozzle INJ as explained below, the central injector position offers greater combustion stability, particularly under poorer charge motion conditions, than a lateral position of the multi-hole injection nozzles INJ.

In the figures, the tip of the injector INJ, which is embodied as a multi-hole injection nozzle, is illustrated as a point P, the multi-hole injection nozzle INJ preferably having five openings at its nozzle tip corresponding to the point P for injection of five injection jets 1, 2, 3, 4, 5 into the combustion chamber of the cylinder.

FIG. 1 shows the injection jets 1, 2, 3, 4, 5 in a three-dimensional view in a Cartesian injector coordinate system with the injector axes $X_{INJ}$, $Y_{INJ}$, $Z_{INJ}$, the axis assigned to the longitudinal axis of the injector INJ being referred to hereinafter as the injector longitudinal axis $Z_{INJ}$.

The following description with reference to the figures shows a preferred embodiment in the form of a multi-hole injection nozzle with five nozzle holes and thus with five injection jets 1, 2, 3, 4, 5.

By way of example, FIG. 1 shows an injection angle $\delta_i$ of an injection jet in space in relation to the injector axis $X_{INJ}$ and the associated injection angle $\gamma_i$ in relation to the injector longitudinal axis $Z_{INJ}$.

The respective injection angles $\delta_i$ and $\gamma_i$ jointly define the position of an injection jet in the combustion chamber as a function of the position of the injector axes $X_{INJ}$, $Y_{INJ}$, $Z_{INJ}$ of the injector coordinate system in the combustion chamber.

The Z View (FIGS. 2A and 2B):

When viewed together, FIGS. 1 and 2A to 2C clarify the position of the injection jets 1, 2, 3, 4, 5 relative to the injector axis $X_{INJ}$, which, according to the invention, starts from the point P (see FIG. 2B) of the injector INJ and extends in axial symmetry relative to an $x_{INJ}/y_{INJ}$ plane (normal plane) between the midpoints M (see FIGS. 2A, 2B) of the intake valves 104A and 104B.

The normal plane $x_{INJ}$; $y_{INJ}$ is considered to be the plane that is spanned between the injector axis $X_{INJ}$ and the orthogonally arranged injector axis $Y_{INJ}$.

Figure 2A:
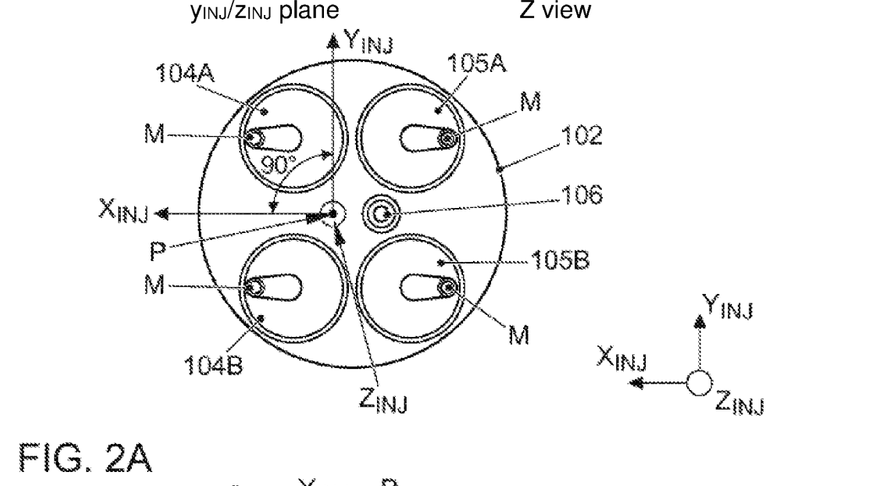
FIG. 2A is a plan view (Z view) of the two-dimensionally illustrated cylinder of FIG. 1 from the z direction without the injection jets.

As a Z view, FIG. 2A shows a plan view on the $x_{INJ}/y_{INJ}$ plane of the two-dimensionally illustrated cylinder according to FIG. 1 with a view from the z direction from above of the cylinder without the injection jets.

Figure 2B:
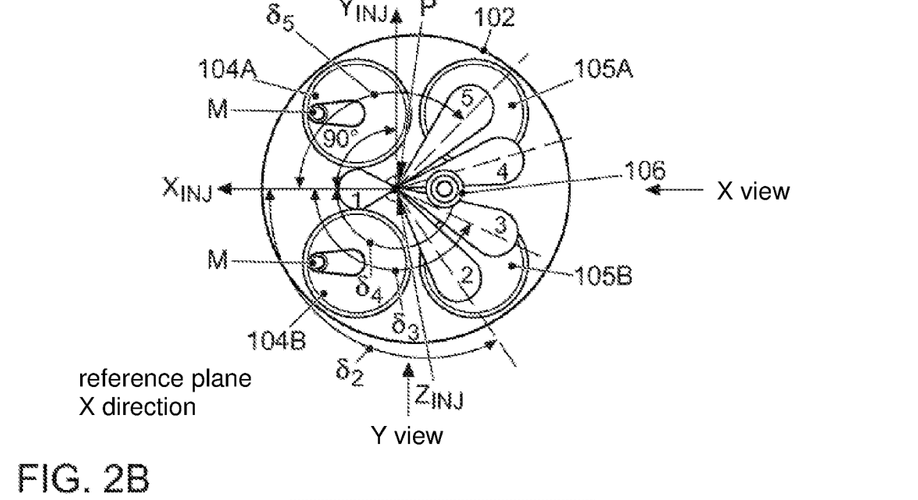
FIG. 2B shows the plan view (Z view) of the two-dimensional cylinder according to FIG. 1 from the z direction with the injection jets.

In FIG. 2B, the injection jets 1, 2, 3, 4, 5 are superposed on the $x_{INJ}/y_{INJ}$ plane in a two-dimensional projection.

Figure 2C:
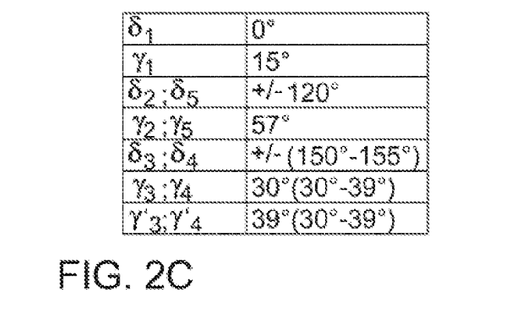
FIG. 2C shows the table according to the invention for illustrating the injection angles.

The injection angles 1, 2, 3, 4, 5 projected in this manner are listed in table FIG. 2C.

The injection angles $\delta_i$ (i=1 to 5) are defined as angles relative to the $x_{INJ}/y_{INJ}$ plane between the longitudinal central axis of the injection jets 1, 2, 3, 4, 5 and the injector axis $X_{INJ}$.

The injection angles $\gamma_i$; $\gamma'_i$ (i=1 to 5) are defined as angles between the respective longitudinal central axis of the injection jets 1, 2, 3, 4, 5 and of the injector longitudinal axis $Z_{INJ}$.

It is clear from FIG. 2B that the injection jet 1 has an injection angle $\delta_1$ of equal to 0°, meaning that it lies on the defined injector plane $X_{INJ}/z_{INJ}$.

An intake-side injection angle $\gamma_1=15°$ is assigned to the injection angle $\delta_1=0°$ relative to the injector longitudinal axis $Z_{INJ}$. See FIGS. 4A and 4B.

The injector longitudinal axis $Z_{INJ}$ emanates from the point P of the injector INJ. The injector longitudinal axis $Z_{INJ}$ runs vertically to the $x_{INJ}/y_{INJ}$ plane and intersects the horizontal $x_{INJ}/y_{INJ}$ plane (see FIGS. 4A and 4B), the angle between the injector longitudinal axis $Z_{INJ}$ and the injector axis $X_{INJ}$ being equal to 90° (according to the Cartesian system).

In a preferred embodiment, in the illustrated central injector position—i.e., in the installed position of the injector relative to an imaginary vertical axis Z (see FIGS. 4A, 4B)—the injector longitudinal axis $Z_{INJ}$ of the injector INJ is inclined in the x direction by $\Delta z_{INJ}=5°$ toward the exhaust valves 105A, 105B. The effects of the invention also occur when the injector is disposed with an inclination in a range between $\Delta z_{INJ}=0°$ to 15°. However, it has been found that an injector inclination of $\Delta z_{INJ}>0°$ toward the exhaust valves 105A, 105B supports the effects of the present invention.

The exhaust-side injection jets 2 and 5 are each arranged so as to be axially symmetrical to the injector axis $X_{INJ}$ and have the injection angles $\delta_2$ and $\delta_5=+/-120°$. When viewed in the clockwise direction, the injection angle $\delta_2$ equals −120° and the injection angle $\delta_5$ equals +120°.

Injection angles $\gamma_2$ and $\gamma_5$ of 57° relative to the injector longitudinal axis $Z_{INJ}$ are assigned to the injection angles $\delta_2$ and $\delta_5=+/-120°$. (See FIGS. 4A and 4B)

The injection jets 3 and 4 are likewise arranged so as to be axially symmetrical to the injector axis $X_{INJ}$ and have the injection angles $\delta_3$ and $\delta_4$ ranging between +/−150° to 155°.

When viewed in the clockwise direction, the injection angle $\delta_3$ is between −150 and −155° and the injection angle $\delta_5$ is between +150° and +155°.

Injection angles $\gamma_3$; $\gamma'_3$ and $\gamma_4$; $\gamma'_4$ of between 30° to 39° relative to the injector longitudinal axis $Z_{INJ}$ are respectively assigned to the injection angles $\delta_3$ and $\delta_4$ between +/−150° to 155°. (See FIGS. 4A and 4B.), as will be explained.

In a first embodiment, injection angles $\gamma_3$ and $\gamma_4$ of 30° relative to the injector longitudinal axis $Z_{INJ}$ are respectively assigned to the injection angles $\delta_3$ and $\delta_4$ between +/−150° to 155°. (See FIGS. 4A and 4B.), as will be explained.

In a second embodiment, injection angles $\gamma'_3$ and $\gamma'_4$ of 39° relative to the injector longitudinal axis $Z_{INJ}$ are respectively assigned to the injection angles $\delta_3$ and $\delta_4$ between +/−150° to +/−155°. (See FIGS. 4A and 4B.)

Each injection jet 1, 2, 3, 4, 5 can thus be henceforth defined in three-dimensional space relative to the injector axis $X_{INJ}$ and the injector longitudinal axis $Z_{INJ}$.

The exhaust-side injection jets 2 and 5 more remote from the spark plug are also referred to as middle injection jets 2 and 5 (see FIG. 2B), since according to the Z view they are arranged between the intake-side injection jet 1 and the exhaust-side injection jets 3 and 4 nearer to the spark plug. The proximity to the spark plug 106 is defined with respect to the δ-angle adjustment range. (The injection angles $\delta_2$ and $\delta_5$ equaling +/−120° are farther away from the spark plug 106 than the injection angles $\delta_3$ and $\delta_4$ between +/−150° to 155.

The X View (FIGS. 3A and 3B):

When viewed together, FIGS. 1 and 3A to 3C clarify the position of the injection jets 1, 2, 3, 4, 5 relative to the injector longitudinal axis $Z_{INJ}$, which, according to the invention, is not arranged in the midpoint of the cylinder starting from the point P (see FIG. 2B) of the injector INJ as seen vertically.

The point P of the injector INJ has an equal first distance to the midpoints M of the intake valves 104A, 104B and also an equal second distance to the midpoints of the exhaust valves 105A, 105B (see FIG. 2A), the distances being different so that the point P (see also FIGS. 4A and 4B) is arranged off-center relative to the longitudinal central axis of the cylinder.

Figure 3A:
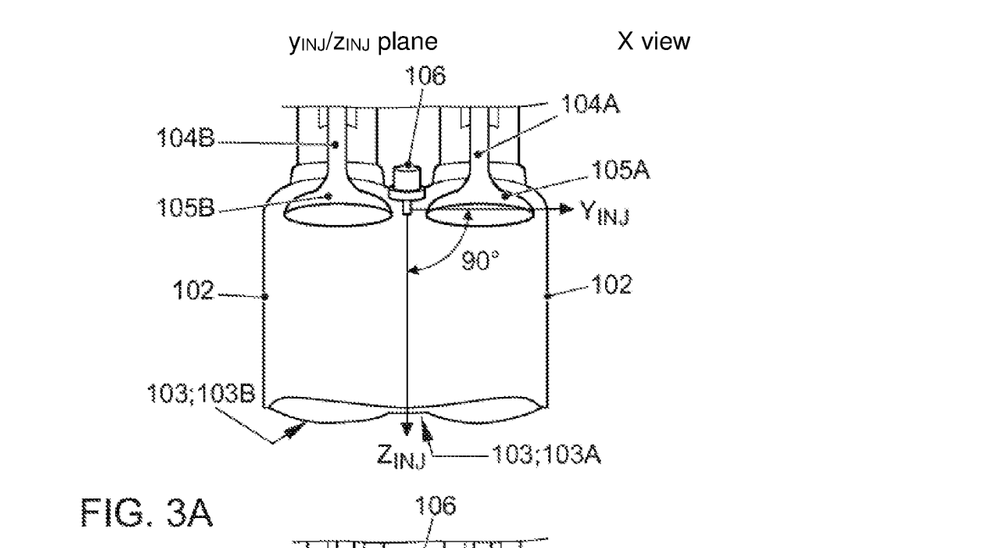
FIG. 3A shows a side elevation plan view (X view) of the two-dimensional cylinder according to FIG. 1 from the x direction without the injection jets.

As an X view comprising a plurality of $y_{INJ}/z_{INJ}$ planes, FIG. 3A shows a side elevation of the two-dimensionally illustrated cylinder according to FIG. 1 with a view from the x direction from one side toward the cylinder without the injection jets.

Figure 3B:
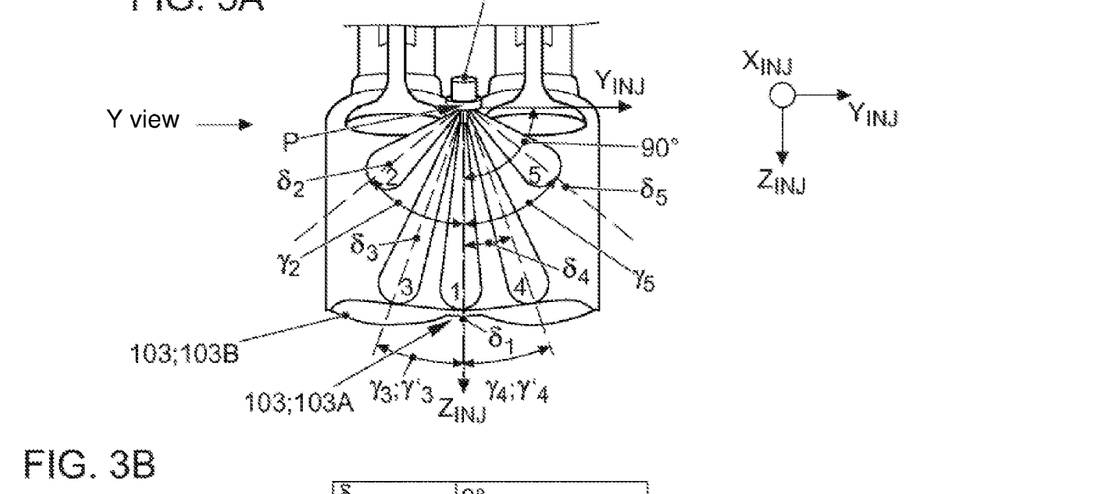
FIG. 3B shows the plan view (X view) of the two-dimensional cylinder according to FIG. 1 from the x direction with the injection jets.

In FIG. 3B, the injection jets 1, 2, 3, 4, 5 are superposed on a $y_{INJ}/z_{INJ}$ plane in a two-dimensional projection.

Figure 3C:
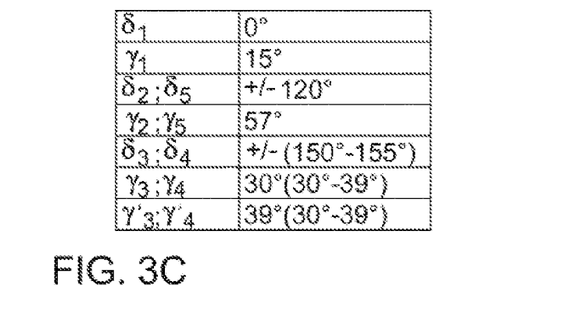
FIG. 3C shows the table according to the invention for illustrating the injection angles.

The injection angles 1, 2, 3, 4, 5 projected in this manner are listed in the table FIG. 3C.

The injection angles $\delta_i$ (i=1 to 5) described in FIGS. 2A and 2B are carried over in FIGS. 3A and 3B, the respectively associated angle $\gamma_i$; $\gamma'_i$ (i=1, 2, 3, 4, 5) that defines the angle between the respective longitudinal central axis of the injection jets 1, 2, 3, 4, 5 and the injector longitudinal axis $Z_{INJ}$ being specified for each of the injection angles $\delta_i$ (i=1 to 5).

The Y View (FIGS. 4A and 4B):

First and Second Embodiment

When viewed together, FIGS. 1 and 4A to 4C clarify the position of the injection jets 1, 2, 3, 4, 5 relative to the injector longitudinal axis $Z_{INJ}$, which, according to the invention, is not arranged in the midpoint of the cylinder starting from the point P (see FIG. 2B) of the injector INJ as seen vertically.

The point P of the injector INJ has an equal first distance to the midpoints M of the intake valves 104A, 104B and also an equal second distance to the midpoints of the exhaust valves 105A, 105B (see FIG. 2A), the distances being different so that the point P (see also FIGS. 4A and 4B) is arranged off-center from the longitudinal central axis of the cylinder.

Figures 4A, 4B:
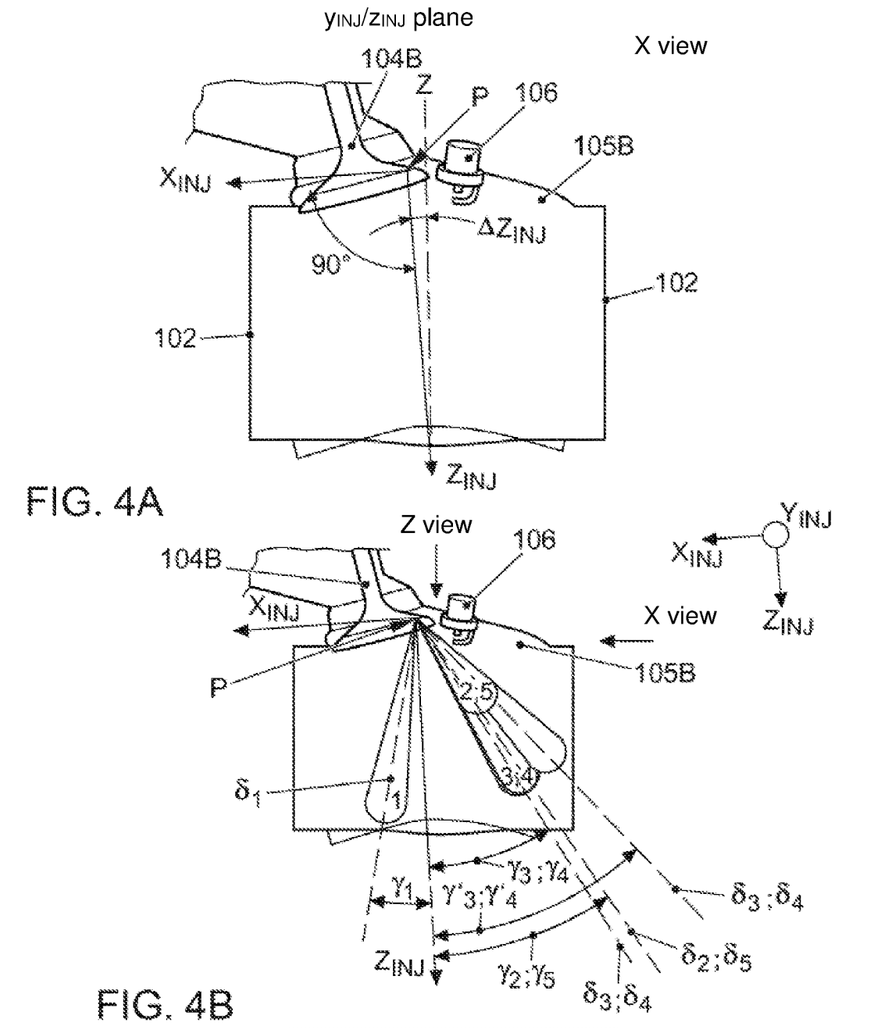
FIG. 4A shows a side elevation plan view (Y view) of the two-dimensional cylinder according to FIG. 1 from the y direction without the injection jets.
FIG. 4B shows the plan view (Y view) of the two-dimensional cylinder according to FIG. 1 from the y direction with the injection jets.

As a Y view comprising a plurality of $y_{INJ}/z_{INJ}$ planes, FIG. 4A shows a side elevation of the two-dimensionally illustrated cylinder according to FIG. 1 with a view from the y direction from one side toward the cylinder without the injection jets.

In FIG. 4B, the injection jets 1, 2, 3, 4, 5 are superposed on an $x_{INJ}/z_{INJ}$ plane in a two-dimensional projection.

The injection jets 1, 2, 3, 4, 5 in FIGS. 4A and 4B are shown rotated to the right by 90° about the Z axis (longitudinal central axis of the cylinder) compared with the injection jets 1, 2, 3, 4, 5 in FIGS. 3A and 3B.

It only becomes clear in FIGS. 4A and 4B that the injector longitudinal axis $Z_{INJ}$ is tilted by a certain angle $\Delta z_{INJ}$ relative to the Z axis (longitudinal central axis of the cylinder) lying vertically in space.

In the exemplary embodiment, the injector longitudinal axis $Z_{INJ}$ is inclined in the x direction by $\Delta z_{INJ}=5°$ toward the exhaust valves 105A, 105B relative to an imaginary vertical axis Z (see FIGS. 4A, 4B).

The injection jets 2 and 3 are thus in front of the $x_{INJ}/z_{INJ}$ plane in FIG. 4B, and the injection jets 4 and 5 are thus behind the $x_{INJ}/z_{INJ}$ plane, with the "wide-set" injection jets 2 and 5 being right up front and all the way to the rear, respectively, in the Y view, and with the injection jets 3 and 4 being up front and in the rear, respectively, in the Y view, so that the two injection jets 3 and 4 are arranged between the jets 2 and 5.

Figure 4C:
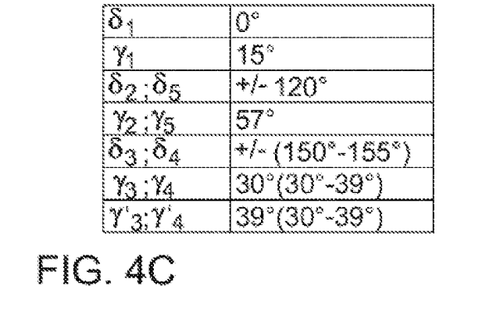
FIG. 4C shows the table according to the invention for illustrating the injection angles.

The injection angles 1, 2, 3, 4, 5 projected onto the $x_{INJ}/z_{INJ}$ plane are listed in the table FIG. 4C.

The injection angles $\delta_i$ (i=1 to 5) described in FIGS. 2A and 2B are carried over in FIGS. 4A and 4B, the respectively associated angle $\gamma_i$; $\gamma'_i$ (i=1, 2, 3, 4, 5) that defines the angle between the respective longitudinal central axis of the injection jets 1, 2, 3, 4, 5 and the injector longitudinal axis $Z_{INJ}$ being specified for each of the injection angles $\delta_i$ (i=1 to 5).

An injection angle $\gamma_1=15°$ is assigned to the injection angle $\delta_1=0°$ of the injection jet 1 relative to the injector longitudinal axis $Z_{INJ}$.

An injection angle $\gamma_2$ of 57° is assigned to the injection angle $\delta_2=-120°$ of the injection jet 2 relative to the injector longitudinal axis $Z_{INJ}$.

An injection angle $\gamma_5$ of 57° is assigned to the injection angle $\gamma_5=+120°$ of the injection jet 5 relative to the injector longitudinal axis $Z_{INJ}$.

In the first embodiment, an injection angle $\gamma_3=+30°$ relative to the injector longitudinal axis $Z_{INJ}$ is assigned to the injection angle $\delta_3=-150°$ of the injection jet 3.

In the first embodiment, an injection angle $\gamma_4=+30°$ relative to the injector longitudinal axis $Z_{INJ}$ is assigned to the injection angle $\delta_4=+150°$ of the injection jet 4.

In the second embodiment, an injection angle $\gamma'_3=+39°$ relative to the injector longitudinal axis $Z_{INJ}$ is assigned to the injection angle $\delta'_3=-155°$ of the injection jet 3.

In the second embodiment, an injection angle $\gamma'_4=+30°$ relative to the injector longitudinal axis $Z_{INJ}$ is assigned to the injection angle $\delta_4=+155°$ of the injection jet 4.

It becomes clear that the orientation of the injection jets 3 and 4 relative to the injector longitudinal axis $Z_{INJ}$ takes place in injection angles $\gamma_3$ and $\gamma'_3$ or $\gamma_4$ and $\gamma'_4$ between +30° and +39°, which will be discussed later.

Independently of the injection angles selected ($\gamma_3$ and $\gamma'_3$ or $\gamma_4$ and $\gamma'_4$) in the $\gamma$-angle adjustment range of the injection jets 3 and 4 between +30° and +39° and the injection angles selected ($\delta_3$ and $\delta_4$) in the $\delta$-angle adjustment range of the injection jets 3 and 4 between +/−150° to 155°, the longitudinal central axes of the jet lobes of the injection jets 2, 3, 4, 5 lie according to the invention in the region of the exhaust valves 105A, 105B and substantially on a plane according to the two-dimensional projection on the $x_{INJ}/z_{INJ}$ plane, as FIG. 4B best illustrates.

Furthermore, it becomes clear that only the longitudinal central axis of the jet lobe of the injection jet 1 injects into the region of the intake valves 104A, 104B. At least one injection jet 1 is necessary in order to inject fuel into the intake-side region of the combustion chamber of the cylinder during injection.

The Effect and Advantages of the Illustrated Orientation of the Injection Jets 1, 2, 3, 4, 5 Within the Combustion Chamber of the Cylinder:

It is clear from the description that only the injection jet 1 (see FIGS. 2A to 2C and FIGS. 4A to 4C) enters the intake-side region of the combustion chamber of the cylinder, and that the injection jets 2, 3, 4, 5 (see FIGS. 2A to 2C and 4A to 4C) inject into the exhaust-side region of the combustion chamber of the cylinder. By virtue of this arrangement, the effect is advantageously achieved that fuel is not injected directly onto the cylinder piston 103, but is guided in the direction of the exhaust-side cylinder wall 102, the combustion air being very finely atomized by the high injection pressures and deflected to the cylinder piston 103 without consequential use of the cylinder wall and guided from there by reflection at the piston recess of the cylinder piston 103 with the aid of the charge motion present in the combustion chamber to the spark plug 106 arranged on the exhaust side and ignited.

Elevation of Injection Jets 2 and 5 as Well as 3 and 4:

The injection jets 2 and 5 and the injection jets 3 and 4 are "geometrically farther up" within the combustion chamber, that is to say "geometrically elevated."

The expression "geometrically farther up" means that the respectively associated longitudinal axis of the injection jets 2 and 5 is oriented further upward toward the cylinder roof 101 over the inventive injection angle $\gamma_2$ and $\gamma_5$ of 57° relative to the injector longitudinal axis $Z_{INJ}$ at the respective injection angles $\delta_2$ and $\delta_5=+/-120°$ and thus further into the upper region of the cylinder wall 102 than is the case with the spray patterns of conventional multi-hole injection nozzles.

Moreover, the respectively associated longitudinal axis of the injection jets 3 and 4 are likewise oriented upward toward the cylinder roof 101 over the inventive injection angle $\gamma_3$; $\gamma'_3$ and $\gamma_4$; $\gamma'_4$ of 30° or 39° depending on the embodiment relative to the injector longitudinal axis $Z_{INJ}$ at the respective injection angles $\delta_3$ and $\delta_4=+/-155°$ and thus further into the upper region of the cylinder wall 102; in other words, the inventive injection angles $\gamma_3$; $\gamma'_3$ and $\gamma_4$; $\gamma'_4$ are oriented upward toward the spark plug 106.

In the two-dimensional projection according to FIG. 4B, the exhaust-side injection jets 2, 3, 4, 5 lie substantially on a plane according to the Y view.

To put it differently, the injection jets 2, 3, 4, 5 are oriented more toward the spark plug 106 as seen in the z direction.

Previously, the described inventive arrangement of the injection jets 2, 3, 4, 5 has been found to be unfavorable because, at conventional injection pressures of <300 bar, such an orientation of the injection jets 2, 3, 4, 5 has resulted in increased wall wetting of the cylinder wall 102 and consequently to increased pollutant emissions. However, calculations revealed the effect that the expected disadvantage is not present in the case of so-called high-pressure injection with injection pressures of ≥300 bar between 300 bar and 500 bar. The injection jets 2, 3, 4, 5 are arranged such that they would normally impinge on the cylinder wall 102. At the present high pressures of ≥300 bar, however, the fuel is atomized into especially small particles. In experiments, no increase or no consequential increase in cylinder wall wetting was observed as a result of the orientation of the injection jets 2, 3, 4, 5.

Overall, it was found that, due to the very fine atomization of the fuel at pressures above ≥300 bar and the charge motion, the penetration depth of the injection jets decreases to such an extent that it is no longer of crucial importance in terms of unwanted cylinder wall wetting whether the injection jets 2, 3, 4, 5 are oriented more toward the piston recess 103A or more toward the edge region 103B (like injection jets 3 and 4) or even toward the cylinder wall 102 (like injection jets 2 and 5). In other words, a tumble flow is advantageously formed in the combustion chamber that is intensified by the lower penetration depth of the injection jets 2, 3, 4, 5 and their interaction with the intake flow, so that cylinder wall wetting is largely avoided.

It was recognized that it is now possible without any drawbacks to geometrically raise the injection jets 2, 3, 4, 5 and place them farther up than usual, since the problems with wall wetting that are otherwise encountered no longer arise due to the reduction in the penetration depth, thus enabling the associated positive effects to be exploited.

Effect of Improving the Charge Motion Within the Combustion Chamber of the Cylinder:

It was advantageously found, however, that the charge motion in the combustion chamber of the cylinder can be positively influenced by the geometric increase of the injection jets 2, 3, 4, 5 within the combustion chamber as a function of the combustion method used (e.g., a Miller combustion method).

For example, in combustion processes in which the intake valves 104A, 104B close early—that is, in which they close before bottom dead center of the cylinder piston 103, as is the case in the Miller combustion process, for example—the charge motion decreases.

However, a certain amount of charge motion is needed in order to positively influence the burn rate in the combustion chamber, i.e., to make it maximally optimal. The burn rate in the combustion chamber after ignition of the fuel by means of the spark plug 106 must be as high as possible or high enough that abnormal combustion in the combustion chamber, which generates high-frequency pressure fluctuations in the combustion chamber of the cylinder, is avoided, so that no knocking occurs.

Advantageously, the previously presented geometric orientation of the injection jets 2, 3, 4, 5 with their associated proposed injection angles influences the charge motion in such a way that the charge motion increases.

The throttle valve is normally closed, particularly during partial-load operation, with the throttle valve continuing to be open upon the early closing of the intake valves 104A, 104B, such as in the case of the Miller combustion process, for example, so throttling occurs via the intake valves.

This causes a drop in pressure over the intake valves 104A, 104B. As a result, the charge cycle losses are reduced in a known manner, and the efficiency of the internal combustion engine 100 is increased. However, the earlier closing of the intake valves 104A, 104B has the disadvantage that the charge motion in the cylinder decreases due to the intake valves' 104A, 104B being closed early. In extreme cases, the air supply is so low upon early closing of the intake valves 104A, 104B that it can even lead to ignition problems. The turbulence resulting from the charge motion is then insufficient to guarantee optimal fuel burn-through.

Due to the fact that the upwardly oriented injection jets 2, 3, 4, 5 are geometrically "farther up" within the combustion chamber than is known from the prior art, the kinetic energy of the injected injection jets 2, 3, 4, 5 within the combustion chamber produces an additional charge motion together with the intake air. In other words, the kinetic energy of the injection jets 2, 3, 4, 5 interacts with the intake air, thereby increasing the charge motion.

Due to the kinetic energy of the geometrically specially arranged injection jets 2, 3, 4, 5 and their interactions with the intake air, an intensified charge motion is created which is converted during compression into turbulence kinetic energy, which ensures that the ignition delay during ignition of the fuel by means of the spark plug 106 is low and the burn rate is high, thereby successfully preventing knocking. The orientation of the injection jets 3, 4 more toward the spark plug 106 supports this effect.

Effect of Improved Cold-Start Behavior:

Particularly at the cold-start operating point of the internal combustion engine 100, very late injections are performed in a known manner in addition to the main injection that even occur after the firing point. It is ensured in a known manner that a conversion of the fuel through the late injection does not lead completely to a piston movement, but rather to a temperature increase in the combustion chamber and thus to an increase in the exhaust gas temperature. As a result of the increased exhaust gas temperature, faster and more optimal utilization of the catalyst arranged in the exhaust system is achieved in the cold-start phase.

The described geometric elevation of the injection jets 3, 4 causes a rich mixture to be present at the spark plug, particularly during the late post-injection.

According to both embodiments, the invention opens up the possibility of the injection jets 3, 4 being oriented more toward the spark plug 106, depending on which angle $\gamma_3; \gamma_4$ (first embodiment) or $\gamma'_3, \gamma'_4$ (second embodiment) is selected, so that a richer mixture is present at the spark plug 106 during cold-start operation.

In the second embodiment, injection angles $\gamma'_3$ and $\gamma'_4$ of 39° relative to the injector longitudinal axis $Z_{INJ}$ are assigned to the injection angles $\delta_3$ and $\delta_4$ between +/−150° to 155° (see FIGS. 4A and 4B), meaning that the injection jets 3 and 4 are moved closer to the spark plug 106 compared to the first embodiment.

That is, the injection jets 2, 3, 4, 5, particularly the injection jets 3 and 4 that are closest to the spark plug 106 with respect to the δ-angle adjustment range of the injection jets 3 and 4 between +/−150° to 155° (compare), are raised farther toward the cylinder wall 102, and, depending on the embodiment, farther toward the cylinder wall 102 and the spark plug 106, in order to improve the heating of the catalyst. As explained previously, there is no consequential increase at all in cylinder wall wetting at the high pressures of ≥300 bar in spite of the geometric elevation according to the first and second embodiments.

Arrangement of the Injection Jet 1 in a Specific Region:

The preferred orientation of the injection jet 1 has already been explained. An intake-side injection angle $\gamma_1=15°$ is assigned to the injection angle $\delta_1=0°$ relative to the injector longitudinal axis $Z_{INJ}$. See FIGS. 4A and 4B.

In principle, the injection jet 1 can be arranged relative to the defined $X_{INJ}$ axis—preferably in a δ-angle adjustment range between +/−45° and—in relation to the defined $Z_{INJ}$ axis in a γ-angle adjustment range between 0° and 65°, or in the three-dimensional space within the combustion chamber spanned in these limits. The effects described are caused in particular by the orientation of the exhaust-side injection jets 2, 3, 4, 5.

Arrangement of the Injection Jets 2, 3, 4, 4 in a Specific Region:

It was observed that, in the two-dimensional projection according to FIG. 4B, the exhaust-side injection jets 2, 3, 4, 5 are oriented substantially within a preferred region according to the Y view.

This region is bounded by the central injection jets 2 and 5 that are remote from the spark plug and between which, depending on the embodiment, the injection jets 3 and 4 near the spark plug are arranged.

The above description applies to a five-hole injector.

However, this description also applies to a six-hole injection nozzle, which is characterized in that the injection jet 1 is divided into two injection jets (not shown) that are symmetrical with respect to the $X_{INJ}$ axis. Unlike in the exemplary embodiment, the injection angle δ1 is then not =0°, but rather 25° or the like in each case.

If a seven-hole injection nozzle is to be constructed, starting with the six-hole injection nozzle, an additional injection jet is assigned symmetrically to the exhaust-side injection jets 2 to 5, which collectively lie in said inventive δ-angle adjustment range between +/−120° relative to the defined $X_{INJ}$ axis and the γ-angle adjustment range between 30° and 57° relative to the defined $Z_{INJ}$ axis, or in the three-dimensional space spanned within the combustion chamber in these limits.

As will readily be understood, the nozzle holes of a multi-hole injection nozzle have the same opening cross sections or different opening cross sections, so that same injection quantities or different injection quantities can be injected at a predetermined pressure over the nozzle holes, so that the amount of fuel injected on the intake side and exhaust side can be varied.

LIST OF REFERENCE SYMBOLS

100 internal combustion engine
101 cylinder roof
102 cylinder wall
103 cylinder piston
103A cavity (piston recess)
103B edge region (piston edge)
104A first intake valve
104B second intake valve
105A first exhaust valve
105B second exhaust valve
M midpoints of intake and exhaust valves
106 spark plug
INJ injector (multi-hole injector)
P point
1 injection jet
2 injection jet
3 injection jet
4 injection jet
5 injection jet
i=1, 2, 3, 4, 5 number of injection jets
δ angle adjustment range relative to the normal plane $x_{INJ}/y_{INJ}$ $\delta_i$ (i=1, 2, 3, 4, 5) injection angle relative to the $z_{INJ}$ injector axis in the x direction $\gamma$ angle adjustment range $\gamma_i$ (i=1, 2, 3, 4, 5) injection angle relative to the $z_{INJ}$ injector longitudinal axis in the x direction $\gamma_3$, $\gamma'_3$ injection angle of the third injection jet in a first and second embodiment $\gamma_4$, $\gamma'_4$ fourth injection angle of the fourth injection jet in a first and second embodiment $X_{INJ}$ injector axis in the x direction $Y_{INJ}$ injector axis in the y direction $Z_{INJ}$ injector axis in the z direction Z vertical z axis in space (longitudinal central axis of the cylinder)

$\Delta Z_{INJ}$ angle of inclination of the injector longitudinal axis $Z_{INJ}$ relative to the Z axis $x_{INJ}/y_{INJ}$ plane injector plane (normal plane)

$y_{INJ}/z_{INJ}$ plane injector plane orthogonal to the $x_{INJ}/y_{INJ}$ plane $x_{INJ}/z_{INJ}$ plane injector plane orthogonal to the $x_{INJ}/y_{INJ}$ plane

The invention claimed is:

1. A combustion engine, comprising:
    at least one cylinder with a combustion chamber, the combustion chamber being bounded by a cylinder roof, a cylinder wall, and a movable cylinder piston,
    a multi-hole injection nozzle and a spark plug being arranged in a central position in the cylinder roof, and
    the multi-hole injection nozzle injecting fuel into the combustion chamber at injection pressures of ≥300 bar via a plurality of injection jets,
    wherein only one injection jet injects fuel into a three-dimensional space within the intake-side combustion chamber, which, viewed in the direction of the longitudinal central axis of the cylinder, lies below an opening of at least one intake valve, and at least four injection jets inject fuel into a three-dimensional space of the exhaust-side combustion chamber located in the direction of the longitudinal central axis of the cylinder below an opening of at least one exhaust valve,
    wherein the three-dimensional space is defined by a $\delta$-angle adjustment range and a $\gamma$-angle adjustment range of the injection angles of the at least five injection jets,
    wherein each of the injection jets is assigned an injection angle, which is defined as an angle relative to an injector axis, the injector axis associated with the injection angle forming a spanned normal plane with a further orthogonal injector axis,
    each injection jet being further associated with an injection angle, which is defined as an angle relative to an injector longitudinal axis that is orthogonal to the normal plane,
    wherein the injection angle of the only one intake-side injection jet relative to the normal plane equals 0°, and the injection angle relative to the injector longitudinal axis equals 15°, whereby the only intake-side injection jet injects in the direction of the cylinder piston into the intake-side region of the combustion chamber of the cylinder, and
    wherein the injection angles of the at least four exhaust-side injection jets are oriented relative to the defined injector axis in an angle adjustment range between +/−100° and +/−170° to the injector axis and relative to the defined injector longitudinal axis in an angle adjustment range between 25° and 75°.

2. The internal combustion engine as set forth in claim 1, wherein each two of the at least four exhaust-side injection jets is arranged symmetrically relative to the defined injector axis of the normal plane.

3. The internal combustion engine as set forth in claim 1, wherein a first injection jet of the at least four exhaust-side injection jets is arranged relative to the normal plane between the only one intake-side injection jet and third injection jet of the at least four exhaust-side injection jets, and
    wherein a fourth injection jet of the at least four exhaust-side injection jets is arranged relative to the normal plane between the only one intake-side injection jet and the third injection jet of the at least four exhaust-side injection jets.

4. The internal combustion engine as set forth in claim 2, wherein the injection angles of a first injection jet and a fourth injection jet of the at least four exhaust-side injection jets within the angle adjustment range relative to the normal plane equal +/−120°, and
    wherein the injection angles within the angle adjustment range relative to the injector longitudinal axis equal 57°,
    whereby the first and fourth exhaust-side injection jets inject substantially in the direction of the cylinder wall into the exhaust-side region of the combustion chamber of the cylinder.

5. The internal combustion engine as set forth in claim 2, wherein the injection angles of a second injection jet and a third injection jet of the at least four exhaust-side injection jets within the angle adjustment range relative to the normal plane equal +/−150°, and
    wherein the injection angles of the second and third exhaust-side injection jets within the angle adjustment range relative to the injector longitudinal axis equal 30°,
    whereby the second and third exhaust-side injection jets inject into the region between the cylinder piston and the cylinder wall into the exhaust-side region of the combustion chamber of the cylinder.

6. The internal combustion engine as set forth in claim 2, wherein the injection angles of a second injection jet and a third injection jet of the at least four exhaust-side injection jets within the angle adjustment range relative to the normal plane equal +/−155°, and
    wherein the injection angles within the angle adjustment range relative to the injector longitudinal axis equal 39°,
    whereby the second and third exhaust-side injection jets inject in the direction of the cylinder wall into the exhaust-side region of the combustion chamber of the cylinder.

7. The internal combustion engine as set forth in claim 1, wherein, when the injector is installed in the center position, the injector longitudinal axis of the injector is inclined relative to a vertical axis z by an angle of inclination of between 0° and 15° in the direction of the exhaust valves.

* * * * *